G. A. LYON.
SUPPORTING DEVICE FOR AUTOMOBILE BUFFERS.
APPLICATION FILED DEC. 7, 1916.
1,266,836.
Patented May 21, 1918.
3 SHEETS—SHEET 1.
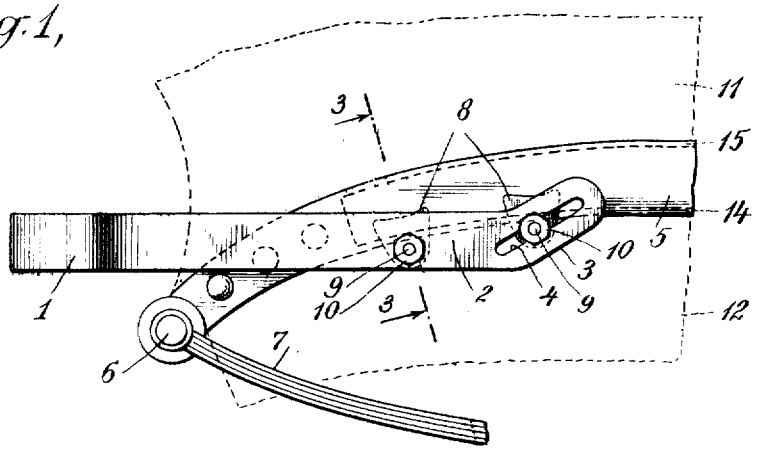
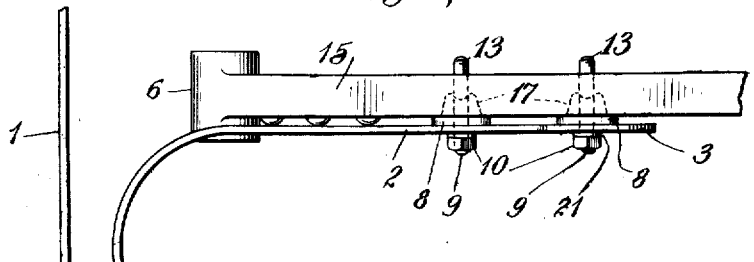
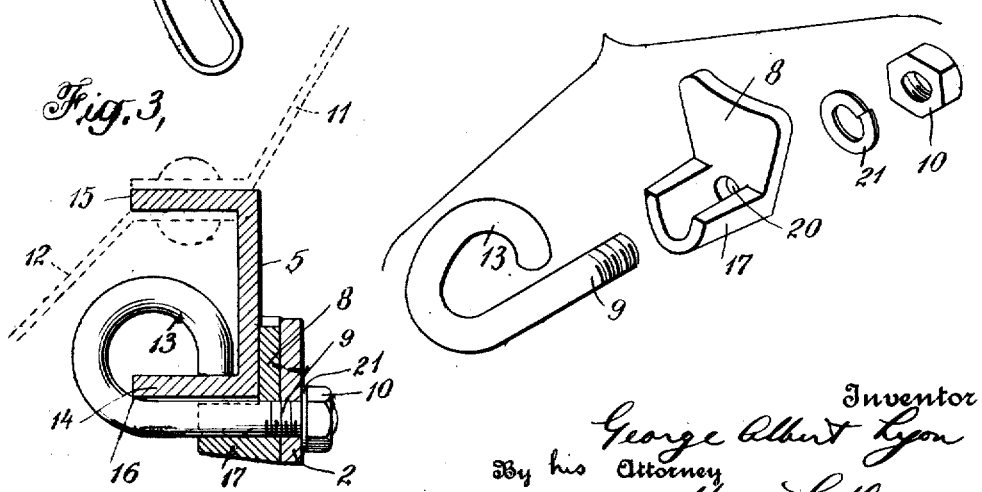
Inventor
George Albert Lyon
By his Attorney
Harry L. Duncan

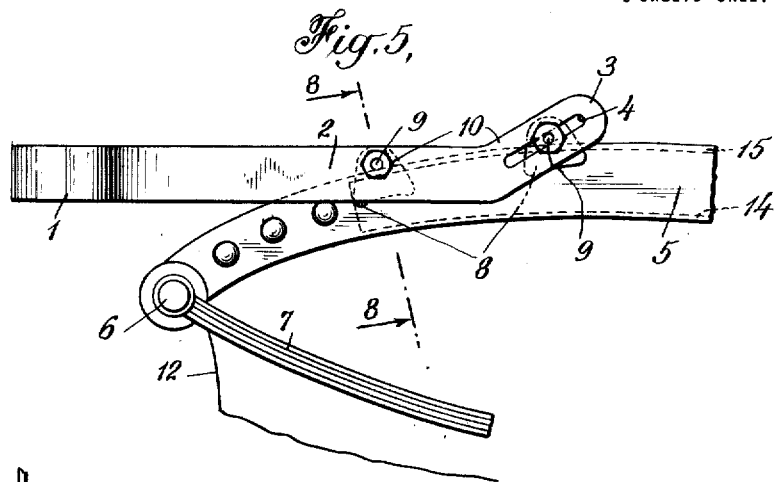
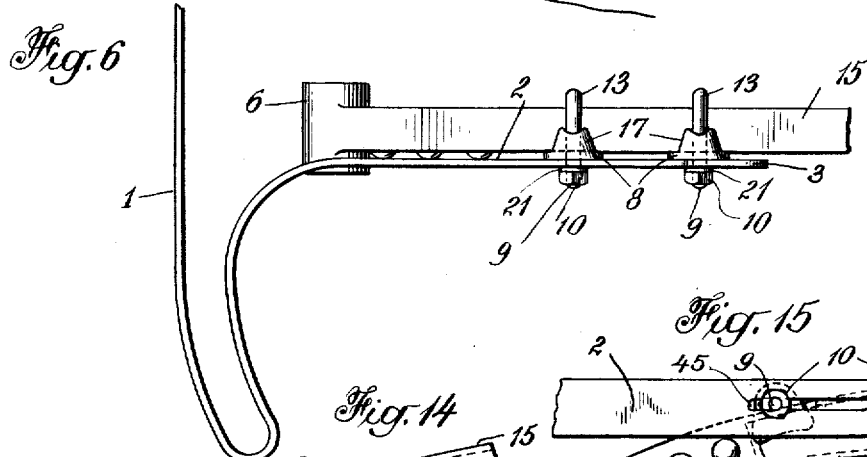
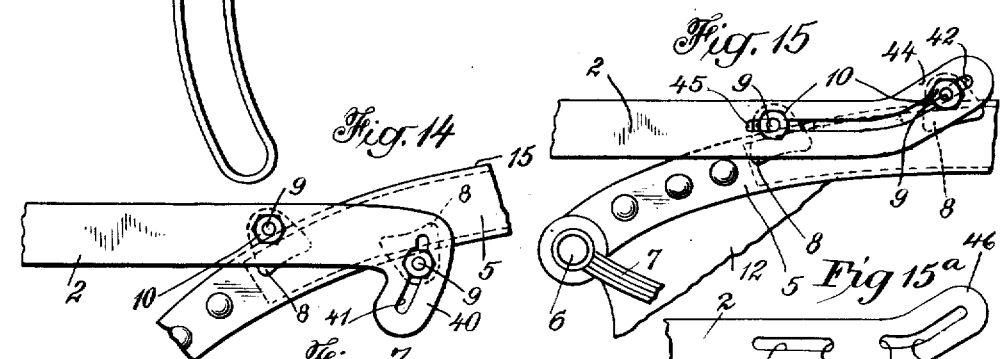
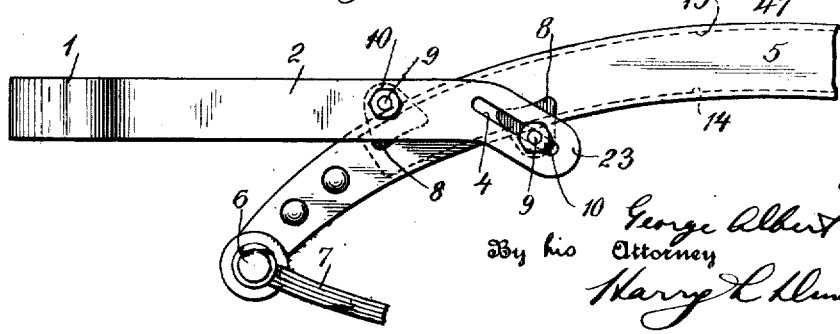

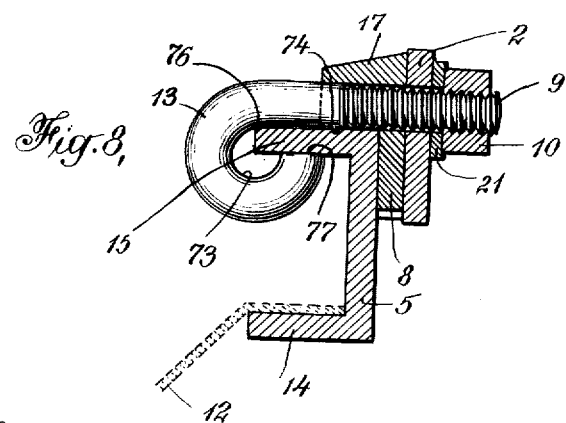
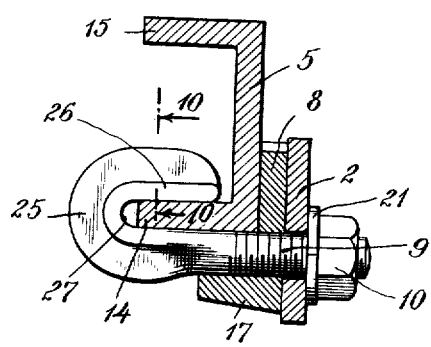
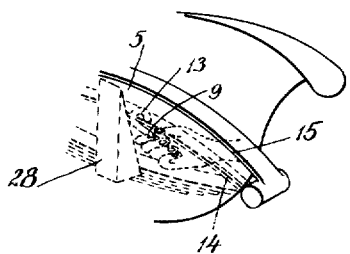
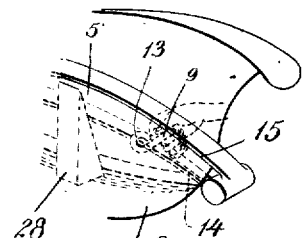
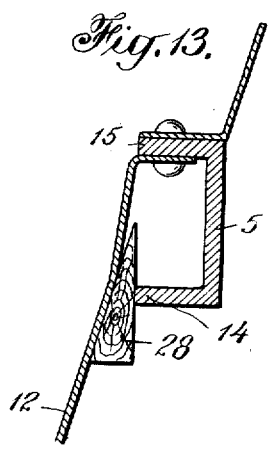

UNITED STATES PATENT OFFICE.

GEORGE ALBERT LYON, OF PHILADELPHIA, PENNSYLVANIA.

SUPPORTING DEVICE FOR AUTOMOBILE-BUFFERS.

1,266,836.   Specification of Letters Patent.   Patented May 21, 1918.

Continuation in part of application Serial No. 90,604, filed April 12, 1916. This application filed December 7, 1916. Serial No. 135,524.

*To all whom it may concern:*

Be it known that I, GEORGE ALBERT LYON, a citizen of the United States, and resident of Philadelphia, county of Philadelphia, State of Pennsylvania, have made a certain new and useful Invention Relating to Supporting Devices for Automobile-Buffers, of which the following is a specification, taken in connection with the accompanying drawings which form part of the same.

The present application is a continuation in part of my co-pending application, Serial No. 90,604, filed April 12, 1916, that is, this application comprises subject-matter taken therefrom.

This invention relates especially to automobile buffer mounting devices of that type in which clamping devices are employed for securing the supporting bars or members of the buffer to the side frames of the machine. Self-alining retainer hooks or bolts are preferably used for this purpose to lock around the projecting inner flange edge, for instance, of the upper or lower side of the channel bar forming the usual side frame member of the machine and these retainer members are preferably so shaped that on tightening the nut or clamping member a wedging or clamping action is effected which maintains the retainer in proper alinement with the frame member as well as preventing withdrawal therefrom.

In the accompanying drawings showing in a somewhat diagrammatic way various illustrative embodiments of the invention, Figure 1 shows in side elevation part of one of the side frames of an automobile with a buffer bar secured thereto.

Fig. 2 is a top view of the same.

Fig. 3 is a transverse section on a larger scale taken substantially along the line 3—3 of Fig. 1.

Fig. 4 is a perspective view showing in separated position the different elements of this attaching device.

Fig. 5 shows in side elevation another arrangement of an attaching device.

Fig. 6 is a top view thereof.

Fig. 7 shows still another form of attaching device for securing the buffer to an automobile.

Fig. 8 is an enlarged detail section taken substantially along the line 8—8 of Fig. 5.

Fig. 9 is a similar view showing another form of attaching member.

Fig. 10 is a transverse section through part of this member along the line 10—10 of Fig. 9.

Fig. 11 is a perspective view showing a method of applying these attaching members.

Fig. 12 is a similar view showing a further operation.

Fig. 13 is a transverse section showing one step of this attaching operation.

Fig. 14 is a side elevation showing still another form of attachment.

Fig. 15 shows still another modification; and

Fig. 15$^a$ is a related detail view.

In many cases mud guards, splash pans, or other elements of the car equipment are so mounted upon the side frame of the car that but a single flange of the latter is available for securing the supporting bar of the buffer thereto, for instance, as shown in Fig. 3 of the drawing, in which 5 represents the web of one of the channeled side frames of the car structure, said web having an upper flange 15 and a lower flange 14. The upper flange has mounted upon it, as shown by dotted lines in Figs. 1 and 3, a mud guard 11 and a splash pan 12, so as to render impracticable the use of any clamping device which embraces the frame or involves the upper flange 15 of the same.

In order therefore to provide an attaching device which can be mounted upon the other flange 14 of the side frame I may employ a bolt having a semi-circular hook member 13 whose end bears against the upper face or inner side of said flange 14, adjacent to the web 5, as shown in Fig. 3, the stem 9 of the bolt being located below the flange and projecting outwardly beyond the face of the frame and through an opening 20 in the bearing plate or bushing 8 contacting with the outer face of the frame and having a flange or extension 17 partly encircling the bolt stem and projecting beneath the lower flange 14 of the frame of the machine, as shown in Fig. 3. The flange 17 is U-shaped in cross section so as to receive the stem 9 of the bolt (see Figs. 3 and 4). The projecting portion of the stem 9 of the clamping bolt is threaded for the reception of a nut 10 whereby the rearwardly projecting supporting bar 2 of the buffer is secured to the bearing plate 8, a split lock washer 21 being, by preference, interposed between the bar 2 and nut 10, as shown in Fig. 3.

Besides the bearing of the end of the hook member 13 of the bolt upon the upper face of the flange 14 said bolt has, at the junction of the head and stem, a curved wedging face or portion 16 which bears upon the lower inner corner of said flange 14, as shown in Fig. 3, and as the stem 9 of the bolt is drawn outwardly on tightening the nut 10 this curved face of the bolt will act as a cam and serve to draw the end of the hook member 13 down on the upper face of the flange in direct proportion to the outward pull of the nut 10 upon the stem 9, consequently said nut not only serves to secure the supporting bar 2 of the buffer firmly in position against the bearing plate 8 and the latter against the frame web 5 but it also serves to rigidly confine the bolt to the flange 14 of said frame.

As the bearing of the end of the hook 13 upon the flange 14 constitutes a fulcrum or bearing point intermediate of the ends of the straight shank 9, the clamping bolt balances itself and is self-retaining on the frame of the car both when the bearing plate and buffer are mounted upon it, and when said buffer and bearing plate have not been secured to the bolt. In the latter case, even if the bolt is only loosely applied to the frame member the weight at the inner end of the shank 9 predominates and the outer end of said shank rises until it contacts with the outer corner of the frame, and when the bearing plate and buffer bar have been applied to the bolt, the weight at the outer end of the shank 9 predominates, and brings the face 16 into contact with the lower inner corner of the flange 14, as shown in Fig. 3.

In order to insure the desired vertically rigid mounting of the supporting bar of the buffer on the frame of the car two attaching bolts are employed one in advance of the other and the location of the front member 1 of the buffer in the desired position in front of the forward wheels of the car is effected by moving both of these bolts forwardly or rearwardly on the flange 14, but in order to provide for the vertical adjustment of the buffer one of the bolts is caused to act as a pivot for the supporting bar 2 and the other bolt engages a portion 3 of the bar which has formed in it an inclined or otherwise vertically extending slot 4 so that after the buffer has been adjusted to the desired position in front of the wheels it can be raised or lowered by moving the latter bolt forwardly or backwardly on the frame, thereby, through the medium of the inclined slot, 4, effecting vertical adjustment of the buffer to the desired extent.

As the plate 8 has a vertical bearing on the frame of the car and its flange 17 a horizontal bearing on the stem of the bolt, there can be no lateral rocking or twisting of said plate or of the bar 2 of the buffer, and, as vertical rigidity is insured by the use of two longitudinally separated attaching devices, it follows that the rigid mounting of the buffer on the side frames of the car is insured.

While I have shown the clamping device as applied to the lower flange of the side frame of the car, it is equally adaptable to the upper flange if said flange happen to be available, as is indicated in Fig. 5. In that case the rearwardly extending supporting bar 2 of the buffer is shown as provided with an upwardly inclined end portion 3 in which the slot 4 is formed so that one of the bolts 9 may have its self-alining retainer hook 13 locked around the upper flange 15 of the frame member, while the rear bolt 9 is adjusted in the inclined slot 4 so as to secure the desired position of the buffer and its rearwardly extending supporting bar which should be substantially horizontal as indicated in Fig. 5.

Fig. 8 shows more in detail one of the self-alining retainer hook bolts, such as are used in Figs. 5 and 6. The stem or shank 9 of the bolt merges by the gradual curve 76 of long radius, thus forming a desirable wedging clamping surface into the relatively short radius or substantially circular inner surface 73 of the hook member 13, so that the alining end 77 of this hook member is substantially parallel to the bolt shank and adapted to coöperate with the inner side of the frame flange 15 adjacent its central portion or at least at a point considerably removed from the flange edge. Such a retainer hook may be conveniently made by swaging a bar of steel into this form as by forcing the blank endwise into a suitably curved die so as to shape the hook end of the retainer and simultaneously somewhat upset it and stiffen the metal by this cold swaging operation. In this way a stiff heavy resilient alining hook end is secured for engagement between the other points of contact of the retainer member, the end surface 77 of this hook being of course formed and the thread cut on the shank at any suitable stages of the manufacturing process. The longitudinal movement of such a retaining member, which, for example, may be effected by screwing up the nut 10 on the bolt shank forces the wedging clamping surface 76 into engagement with the corner of the upper flange 15 of the frame member which simultaneously forces the hook end 77 into engagement with the underside of this flange and secures forcible contact between the shank of the bolt and the adjacent upper and outer corner between the upper flange and the web 5 of the frame member. In this way a three-point alining and wedging contact is secured between the wedging retainer and the flat plate or flange, since the alining end of the retainer is located between and preferably about midway between the other points of contact. This secures a firm and yet resilient contact between these parts because of the somewhat resilient pressure at the points of contact which also slightly bends the metal of the flange or plate and insures the desired alinement of the retainer, since obviously the shank or projecting end of the retainer cannot yield substantially in a vertical direction. The maintenance of the alinement of the retainer in a horizontal plane, so as to prevent the shank of the retainer swinging horizontally, may be still further promoted beyond what is secured by tightening the bolt by using a bearing plate engaging the web or edge of the plate upon which the retainer is clamped and by a flange or bushing secured to this bearing plate which sufficiently encircles or engages the shank of the retainer to substantially keep it in alinement with respect thereto. This flange or bushing 17 on the bearing plate 8 preferably has its lower faces or edges 74 formed so as to extend around and be held somewhat out of contact with the frame flange 15 or other plate with which the retainer coöperates so that in this way the retainer may directly engage the plate and secure still more firm contact therewith. As shown in Fig. 5 the bearing plate 8 may have a substantially triangular form so as to secure ample bearing surface on the outside of the web of the frame member, and if desired a somewhat upwardly curved contour may be given to the depending part of this bearing plate, that is, the part farthest away from the shank of the retainer with which it coöperates. It is of course understood that such hook bolts or retainer members may be used for securing various devices to the flanged frame members of automobiles or to other channel bars or angle-iron members where a self-alining action is desirable and firm or rigid support needed in cases where the plate cannot be conveniently notched or drilled or completely encircled. Another form of retainer member is shown in Fig. 9 as having the shank 9 connected with a hook in which the curved web 27 is adapted to act as a wedging clamping member in connection with the lower corner of the flange 14 of the frame member in this instance, while the alining member 26 is in the form of a substantially flat surface adapted to engage the upper surface or inner side of this frame flange. This hook portion of the retainer may be stiffened in any suitable way as by forming thereon the stiffening rib 25 which can of course be readily done by manufacturing the retainer member by usual drop forging methods.

Fig. 7 shows another way in which the hook bolts or clamping retainers may be arranged on the frame member 5 of the automobile, one of the retainers or hook bolts 9 which is passed through the forward hole in the side supporting bar of the buffer engaging in this instance the upper flange 15 of the side bar, while the rear hook bolt retainer 9 may coöperate with the lower flange 14 of the side bar and may have its shank passed through the downwardly extending slot 4 of the bent end 23 of the bar. In this Fig. 7 form of attachment the bumper is turned over or reversed, so that its supporting bars have their ends bent downward instead of being bent upward as shown in Figs. 1 and 5. It is thus seen that by the use of hook bolts of this general character, one or more of which may be turned or adjusted angularly about its shank with respect to the coöperating bumper supporting member such as the side supporting bar of the buffer, the buffer supporting members may be attached to the automobile in any one of the three ways described; that is, the one or more hook bolts or retainers on each side of the buffer may all engage the lower flange of each frame member, as is shown in Fig. 1, or both hook bolts may engage the upper flange of each frame member, as shown in Fig. 5, or either hook bolt may engage the upper flange and the other the lower flange of each frame member when the bumper supporting members have been turned upside down, as shown, for example, in Fig. 7. This makes the buffer mounting practically universal in character, so that it can fit practically any style of automobile frame and also gives it a wide range of vertical and horizontal adjustment with respect thereto.

Another arrangement in which the wedging retainers engage both flanges of the side frame member of the machine is shown in Fig. 14 in which the front hook bolt or other retainer member may engage the upper flange 15, while the rear bolt engages the lower flange 14 and has its shank 9 passing through an adjusting slot 41 formed in the downwardly bent end 40 of the rearwardly projecting supporting bar 2 of the buffer. In this case also this adjusting slot 41 is given a curved form so as to extend substantially circumferentially about the other bolt 9 so that after this front retainer or clamping hook bolt has been put in place the rear bolt may be loosely adjusted and then the buffer bars swung vertically until the desired angular position has been secured. This makes the angular adjustment of the buffer somewhat more easy and convenient, but then the buffer does not have the advantage of being so firmly or securely held in position, since a mere loosening or sliding of the rear bolt or retainer in its adjusting slot varies the angular position of the buffer. While with the other forms of angular adjusting slots which secure this vertical extent of the slots such as in the form shown in Figs. 5 and 7, any change in the angular position of the buffer necessitates a movement of one of the retainers along the frame member and the angle of the adjusting slots is preferably so arranged that frictional slipping is practically prevented under the forces tending to move the buffer vertically when collision occurs, for instance, and it is of course understood that the angle of this adjusting slot may be made still more nearly horizontal to give increased grip between the parts where desired.

Still another arrangement is shown in Fig. 15 in which the two retainers or wedging hook bolts 9 are shown in coöperation with the upper flange 15 of the side frame of the machine. These bolts are shown as coöperating with a somewhat crescent-shaped or curved adjusting slot 45 in the rear supporting bar 2 of the buffer having an upwardly turned end 44 in which the more angular end 42 of the slot is located, so that a still greater range of adjustment can be secured in this way at the expense of rigidity of the buffer to some extent, unless one of the retainers is in substantial contact with one end of the adjusting slot so as to prevent substantial backward movement of the buffer member. If desired, however, this curved or crescent-shaped adjusting slot may be formed in two sections as shown in Fig. 15ª in which the two slots 47, 48 in the curved end 46 of the rear supporting bar 2 of the buffer are shown as separated at their adjacent ends 49 by an intermediate connecting portion, which stiffens the buffer bar especially under vertical strains.

With some forms of automobile construction the splash pans extend down quite sharply from their point of attachment to the upper flange of the frame members of the machine as is indicated in Fig. 13 so that it is desirable to wedge or force the splash pan 12 away from the lower flange 14 of the frame member as by driving a wooden or other wedge 28 between these two parts as shown in Fig. 13 before applying the wedging hook bolts or retainers. Then when the splash pan has been forced away to the necessary extent these hook bolts may as indicated in Fig. 11 be inserted so that they are substantially parallel to the splash pan and then when the hook end 13 is properly located above the lower flange 14 of the frame member the shank 9 of the retainer bolt may be swung around horizontally or parallel to the lower frame flange into the position shown in Fig. 12 so that the shank of the bolt then projects outward beyond the connecting web 5 of the frame member so that the buffer bar and other parts, such as the bearing plate if it is used may be secured to the shank of the hook bolt.

This invention has been described in connection with a number of illustrative embodiments, forms, shapes, proportions, sizes, materials and arrangements, to the details of which disclosure the invention is not of course to be limited, since what is claimed as new and what is desired to be secured by Letters Patent is set forth in the appended claims.

I claim:

1. In automobile buffers, a buffer having an impact receiving portion and connected rearwardly extending flat spring strip supporting members each formed with securing apertures, and wedging self-alining retainer hooks having shanks to extend through said securing apertures and each having a resilient alining hook end adapted to be locked around the same flange of the coöperating side frame member of the automobile and engage the flange adjacent its middle portion, there being wedging clamping surfaces formed on said retainer hooks to engage the edge of the flange and to wedge the alining ends of the hooks into holding alining engagement with the flange and insure contact between the shanks and the outer edge of the flange, bearing plates engaging the frame members and having holes through which pass the shanks of said hooks and having bushings extending along said shanks to maintain alinement therewith and nuts on said shanks to securely hold the buffer in adjusted position.

2. In automobile buffers, a buffer having supporting members each formed with apertures and wedging self-alining retainer members having shanks to coöperate with said apertures each having an alining end to extend around a flange of the side frame members of the automobile and coöperate with the opposite side of the flange, there being wedging clamping surfaces formed on said retainer members to wedge the alining end of the member into holding alining coöperation with the flange and means coöperating with said shanks to securely hold the buffer in adjusted position.

3. In automobile buffers, a buffer having rearwardly extending supporting members each formed with a securing hole and with a securing slot formed at a slight angle to the center line of the adjacent part of the supporting member, and retainer members having shanks to coöperate with said holes and slots and adapted to adjustably engage the flanges of the automobile frame members and means removably and securely holding said supporting members on said shanks to enable the shanks coöperating with said slots to be adjusted along the frame members to vary the angular position of the buffer.

4. In automobile buffers, a buffer having extending supporting members formed with securing apertures and with adjusting securing openings arranged at a slight angle to the center line of the adjacent part of the supporting member, and retainer members having shanks to coöperate with said apertures and to closely engage said openings to adjustably engage the flanges of the automobile frame members, and means removably and securely holding said supporting members on said shanks to enable the shanks coöperating with said openings to be adjusted along the frame members to change the angular position of the buffer.

5. In automobile buffers, a buffer having impact portions and connected rearwardly extending supporting members formed with securing apertures and with adjusting securing openings located to the rear of said apertures and extending at an angle to the center line of the adjacent part of the supporting member to enable said securing openings to extend either upwardly or downwardly to the rear of said apertures when said buffer is reversed in position and retainer hooks having shanks extending through said securing apertures and openings to render said retainer hooks revolubly adjustable with respect to said supporting members, said retainer hooks being either all adapted to lock around the upper flanges or all around the lower flanges of automobile frame members or to simultaneously lock around both the upper and lower flanges of said members when said buffer is turned upside down.

6. In automobile buffers, a buffer having impact members and rearwardly extending supporting members each formed with a securing aperture and with a securing slot located to the rear of said aperture to enable said securing slot to extend either upwardly or downwardly to the rear of said aperture when said buffer is reversed in position and retainer hooks having shanks extending through said securing apertures and slots to render said retainer hooks revolubly adjustable with respect to said supporting members, said retainer hooks being either all adapted to lock around the upper flanges or all around the lower flanges of automobile frame members or to simultaneously lock around both the upper and lower flanges of said members when said buffer is turned upside down.

7. In automobile buffers, a buffer having front impact members and rearwardly extending supporting members each formed with adjusting securing apertures and retainer members having portions extending through said apertures and reversibly arranged with respect to said supporting members so that said retainer members are adapted to all engage either the upper or lower flanges of the frame members of an automobile, or to engage one of said flanges at the rear portions of said supporting members and to engage the other flange in advance thereof.

8. In automobile buffers, a buffer having a front impact member and connected supporting members and two self-alining hook retainer members having adjustable connection with each of said supporting members to adjust the angular position of said buffer, said retainer members having hooked ends extending around each of the flanges of the coöperating automobile frame member at horizontally separated points and engaging the inner sides of said frame flanges at a distance from the flange edges and resisting angular movement of said buffer impact member in one direction by the engagement of said retainer members with the outer sides of said frame flanges.

9. In automobile buffers, a buffer having an impact portion, bearing members to be connected with said buffer and each having a portion adapted to extend around two outer sides of one of the automobile frame members, a one-piece retainer member coöperating with each bearing member and having a hooked end extending around a flange of one of said frame members and coöperating with an inner face thereof which is opposite to said bearing member and means to force together said bearing member and the hook end of said retainer to secure them to said frame member.

10. In automobile buffers, a buffer having an impact portion, bearing members to be connected with said buffer, a one piece retainer member coöperating with each bearing member and having a hooked end adapted to extend around a flange of one of the automobile frame members and coöperate with an inner face thereof substantially opposite to said bearing member and means to force together said bearing member and the hook end of said retainer to secure them to said frame member.

11. In automobile buffers, an automobile having frame members provided with flanges, a buffer having an impact portion, bearing members to be connected with said buffer and to extend around two outer sides of each of said frame members, self alining hook retainer members coöperating with said bearing members and each having a hooked end extending around a flange of one of said frame members and coöperating with an inner face thereof which is opposite to the coöperating bearing member and means to force together said bearing members and retainers to secure them to said frame members and force the edges of the flanges of said frame members into wedging engagement with said retainers.

12. In automobile buffers, an automobile having channeled frame members and mud guards and a splash pan attached to said frame members at the front of the machine, a buffer having rearwardly extending supporting members, self-alining retainer members to be removably secured to said supporting members of the buffer, there being a plurality of said retainer members having portions extending around one of the flanges of each of said frame members and engaging the side of the frame flange and having wedging portions engaging the flange to draw and hold the connected supporting member inward toward an outer face of the corresponding frame member, and means for maintaining said supporting members in substantial alinement with said frame members.

13. In automobile buffers, an automobile having flanged frame members, a buffer having rearwardly extending supporting members and means engaging the outer sides of said frame members for laterally offsetting said supporting members from the corresponding frame members of the automobile and promoting the alinement of said supporting members therewith and self-supporting retainers connected to said means and said supporting members and having portions coöperating with the inner portions of one of the flanges of each of the automobile frame members and extending around the flange edge and securing devices operated from the outer sides of said frame members to clamp said supporting members of the buffer and said means against the outer sides of the frame members and solely support and hold the supporting members of the buffer in position with respect to said frame members.

14. In automobile buffers, an automobile having flanged frame members and mud guards and a centrally located splash pan attached to the upper flange of each of said frame members and extending along the same to the front end thereof to leave only the lower of the flanges of each of said frame members for attaching purposes, a buffer having rearwardly extending supporting members each formed with securing apertures and wedging self-alining retainer hooks having shanks to extend through said securing apertures and each having a resilient lining hook end adapted to be locked around the lower flange of the coöperating frame member of the automobile outside of said splash pan and to engage the inner side of said flange at a point away from the flange edge, there being wedging clamping surfaces formed on said retainer hooks to engage the flange edge and wedge the alining ends of the hooks into holding engagement with the flange, bearing plates engaging the frame members and connected to the shanks of said hooks and having portions extending along said shanks to maintain alinement therewith and nuts on said shanks to releasably hold said retainer hooks and the buffer in adjusted position.

15. In automobile buffers, an automobile having flanged frame members, a centrally located splash pan secured adjacent to one flange of each of said frame members and extending along the same adjacent the front of the automobile, a buffer having rearwardly extending supporting members and a plurality of self-alining retainers having portions extending around one of the flanges of each one of said frame members to engage inner portions thereof remote from the edges of said flanges and each supporting itself in connection therewith and means coöperating with said retainers to removably secure said supporting members in coöperation with the outer sides of said frame members.

16. In automobile buffers, an automobile having flanged frame members and mud guards and a centrally located splash pan attached to the upper flange of each of said frame members and extending along the same adjacent the front of the automobile to leave an exposed lower flange on each of said frame members, a buffer having rearwardly extending supporting members, and integral retainers, each having a portion to be extended around an exposed flange of said frame members to which said splash pan is attached and coöperating with the inner portion of the frame member to hold said retainer in substantially rigid self-supporting position with respect to its coöperating flange and means coöperating with said retainers to removably secure said supporting members in coöperation with said frame members.

17. In automobile buffers, an automobile having flanged frame members and mud guards and a centrally located splash pan attached to said frame members to leave only the lower flange of each of said frame members for attaching purposes, a buffer having rearwardly extending supporting members each formed with securing apertures and retainer hooks having shanks to extend through said securing apertures and each having a hook end adapted to be locked around the lower flange of the coöperating frame member of the automobile outside of said splash pan and to coöperate with the inner side of said flange at a point away from the flange edge, there being wedging clamping means to wedge the hooks into holding coöperation with the flange, bearing plates coöperating with the frame members and connected to the shanks of said hooks and nuts on said shanks to hold the buffer in adjusted position.

18. In automobile buffers, an automobile having flanged frame members and mud guards and a splash pan attached to said frame members at the front of the automobile to leave only the side portions and the lower flanges of said frame members exposed, a buffer having rearwardly extending supporting members provided with one piece clamping members which extend around the lower flanges of said frame members and coöperate with the inner sides of said frame members at points removed from the flange edges thereof and provided with externally operated means coöperating with the outer sides of said frame members for tightening said clamping members into holding engagement with the inner sides of said flanged frame members to solely support the attaching members and buffer.

19. In automobile buffers for an automobile having flanged frame members and mud guards and a splash pan attached to said frame members at the front of the automobile to leave only the side portions and the lower flanges of said frame members exposed, a buffer having rearwardly extending supporting members provided with clamping members which extend around the lower flanges of said frame members and make contact with the inner sides of said frame members at points removed from the flange edges thereof and provided with externally operated means coöperating with the outer sides of said frame members for tightening said clamping members into holding engagement with the inner sides of said flanged frame members to solely support the attaching members and buffer.

20. In automobile buffers, an automobile having flanged frame members and devices attached to said frame members at the front of the automobile to leave only the outer side portions and one of the flanges of said frame members exposed for attaching purposes, a buffer having rearwardly extending supporting members provided with one piece retainer hook members which extend around the attaching flanges of said frame members and coöperate with the inner sides of said frame members at points somewhat removed from the flange edges thereof and provided with means coöperating with the outer sides of said frame members for tightening said retainer hooks into holding engagement with the inner sides of said flanged frame members to solely support the attaching members and buffer.

21. In automobile buffers, an automobile having flanged frame members and mud guards and a centrally located splash pan attached to a flange of each of said frame members and extending along the same to the end thereof to leave only one flange of each of said frame members for attaching purposes, a buffer having rearwardly extending supporting members and coöperating one piece retainer members having clamping portions adapted to be extended around the attaching flange of the coöperating frame member of the automobile outside of said splash pan and to engage the inner side of said frame member at a point away from the flange edge, bearing plates engaging the frame members and connected to the retainer members to maintain alinement therewith and screw threaded clamping means coöperating with said retainers and bearing plates to clamp them in adjusted position on the frame members.

22. In automobile buffers, an automobile having flanged frame members and protecting devices attached to one of each of said frame members to leave only one of the flanges of each of said frame members for attaching purposes, a buffer having rearwardly extending supporting members and coöperating one piece retainer members having portions adapted to be extended around the attaching flange of the coöperating frame member of the automobile adjacent said protecting devices and to coöperate with the inner side of said frame member at a point away from the flange edge, and externally operated screw clamping means to clamp said retainers in securing position on said frame members and to solely support said buffer therefrom.

23. In automobile buffers, an automobile having flanged frame members and protecting devices attached to one of the flanges of each of said frame members to leave only the lower flange of each of said frame members for attaching purposes, a buffer having extending supporting members and coöperating retainer members having portions adapted to be extended around the attaching flange of the coöperating frame member of the automobile adjacent said protecting devices and to coöperate with the inner side of said frame member at a point away from the flange edge, and externally operated clamping means coöperating with the outer sides of said frame members to clamp said retainers in securing position on said frame members to solely support said buffer.

24. In attaching devices adapted for use in attaching an automobile buffer or the like to automobile frame members having projecting flanges, a plurality of hook retainers coöperating with one of said frame members and comprising a one-piece hook retainer having a hooked portion adapted to extend around one of the flanges of said frame members and having a hook-end adapted to coöperate with an inner side of said frame member considerably away from the flange edge, a connected bearing member adapted to extend around the outer side of said frame flange and the outer side of said frame member which is opposite to said flange edge and securing means for said retainer and adapted to clamp said bearing member and a supporting member to the web of the coöperating frame member.

25. In attaching devices adapted for use in attaching an automobile buffer or the like to automobile frame members having projecting flanges, a plurality of hook retainers coöperating with one of said frame members and comprising a hook retainer having a hooked portion adapted to extend around one of the flanges of said frame members and adapted to coöperate with an inner side of said frame member considerably away from the flange edge, a connected bearing member adapted to extend in coöperation with the outer side of said frame member which is opposite to said flange edge and securing means for said retainer and adapted to clamp said bearing member to the web of the coöperating frame member.

26. In attaching devices adapted for use in attaching an automobile buffer member to the flanged frame members of an automobile, a plurality of hook retainers clamped to one of said frame members and comprising a retainer having a hooked portion adapted to extend around one of the flanges of said frame member and adapted to engage the inner side of said frame flange, a connected bearing member adapted to coöperate with a flange of the frame member and having a bearing plate adapted to coöperate with the web of said frame member and a securing device coöperating with said retainer and adapted to clamp said bearing member to the coöperating frame member.

27. In attaching devices adapted for use in attaching an automobile buffer member to the flanged frame members of an automobile, a retainer having a hooked portion adapted to extend around one of the flanges of said frame member and adapted to coöperate with the inner side of said frame member, a connected bearing member adapted to coöperate with a flange of the frame member and having a bearing plate adapted to coöperate with the adjacent outer side of said frame member, and a securing device coöperating with said retainer and adapted to clamp said bearing member to the coöperating frame member.

28. In attaching devices adapted for use in attaching an automobile buffer or the like to automobile frame members having projecting flanges, a one-piece retainer having a hooked portion adapted to extend around one of the flanges of one of said frame members and having a hook end adapted to coöperate with an inner side of said frame member considerably away from the flange edge and a bearing member adapted to extend around the outer side of said frame flange and the outer side of said frame member which is opposite to said flange edge and having an aperture through which the shank of said retainer extends to have an alining action in connection therewith and hold the shank of said retainer in substantially rigid projecting attaching position when said retainer is forced transversely of said flange.

29. In attaching devices adapted for use in attaching an automobile buffer or the like to automobile frame members having projecting flanges, a one-piece hook bolt retainer having a hooked portion adapted to extend around the edge of one of the flanges of said frame members and a member adapted to coöperate with an inner side of said frame member considerably away from the flange edge, a connected bearing member adapted to extend around the outer side of said frame member which is opposite to said flange edge and a securing device coöperating with said retainer and adapted to clamp said bearing member and a buffer member to said coöperating frame member.

30. In attaching devices adapted for use in attaching an automobile buffer or the like to automobile frame members having projecting flanges, a hook bolt retainer having a hooked portion adapted to extend around one of the flanges of said frame members and having a hook end adapted to coöperate with an inner side of said frame member considerably away from the flange edge, a bearing member adapted to extend around the outer side of said frame flange and the outer side of said frame member opposite to said flange edge and having an alining aperture through which said retainer extends, a nut coöperating with the threaded end of said retainer and adapted to clamp the bearing member and a supporting member to the coöperating frame member.

31. In attaching devices adapted for use in attaching an automobile buffer or the like to automobile frame members having projecting flanges, a one-piece retainer having a hooked portion adapted to extend around one of the flanges of said frame members and having a hook end adapted to coöperate with an inner side of said frame member considerably away from the flange edge, a bearing member adapted to extend around the outer side of said frame flange and the face of said frame member which is opposite to said flange edge and having an aperture through which said retainer extends and means acting on said retainer and adapted to clamp the bearing member to the coöperating frame member.

32. In attaching devices adapted for use in attaching an automobile buffer member to the flanged frame member of an automobile, a one-piece hook bolt retainer having a hooked portion adapted to extend around one of the flanges of said frame members and having a hook end adapted to engage the inner side of said frame flange, a bushing adapted to extend along said flange of the frame member and having a bearing plate adapted to coöperate with the web of said frame member and having a bolt hole through which said retainer extends, and a tightening nut coöperating with the threaded end of said retainer and adapted to clamp said buffer member and bushing to the coöperating frame member and force the edge of the flange of said frame member into wedging engagement with said retainer.

33. In devices adapted for attaching an automobile buffer to the frame of an automobile having flanged frame members, a one-piece self-alining retainer hook bolt having an alining end to coöperate with the inner side of the flange of one of said frame members and having a shank portion adapted to coöperate with the opposite side of said flange, means to force said alining end into holding engagement when the shank portion of said retainer is forced transversely of said flange and an apertured bearing plate extending around said shank portion to engage a face of said frame member.

34. In devices adapted for attaching an automobile buffer to the frame of an automobile having flanged frame members, a one-piece retainer having an end portion to coöperate with the inner face of one of said frame members away from the flange edge and having a shank portion adapted to coöperate with the outer side of said frame member and means coöperating with said retainer and adapted to force said end portion into holding engagement when the shank portion of said retainer is forced transversely of said flange.

35. In devices adapted for attaching an automobile buffer to the frame of an automobile having flanged frame members, a one-piece self-alining retainer hook having an alining end to coöperate with the inner side of the flange of one of said frame members away from the flange edge and having a shank portion adapted to engage the opposite side of said flange and means acting in connection with said retainer and adapted to engage said frame member and force said alining end into holding action when the shank portion of said retainer is forced transversely of said flange.

36. In devices adapted for attaching automobile buffers to the frame of an automobile having flanged frame members, a one-piece self-alining retainer hook bolt having a shank to engage one side of the flange of one of the frame members and having a curved hook portion in the same plane as said shank to facilitate adjustment and provided with a stiffened and thickened alining end to engage the other side of the flange of said frame member at a point considerably away from the flange edge and provided with wedging clamping means to force said alining end into holding engagement when the shank portion of said retainer is forced transversely of said flange and rigidly support the end of said shank portion in projecting attaching position beyond said frame member.

37. In devices adapted for attaching automobile buffers to the frame of an automobile having flanged frame members, a one-piece self-alining retainer hook bolt having a shank to coöperate with one side of the flange of one of the frame members and having a curved hook portion provided with an alining end to coöperate with the other side of the flange of said frame member away from the flange edge and provided with clamping means to force said alining end into holding action when the shank portion of said retainer is forced transversely of said flange and support the end of said shank portion in projecting attaching position beyond said frame member.

38. In devices adapted for attaching an automobile buffer to the frame of an automobile having flanged frame members, a one-piece self-alining retainer having an alining end to engage one side of the flange of one of said frame members away from the flange edge and having a body portion adapted to coöperate with the opposite side of said flange and means to wedgingly force said alining end into holding engagement when the body portion of said retainer has been forced transversely of said flange.

39. In attaching devices adapted for use in attaching an automobile buffer or the like to automobile frame members having projecting flanges, a one-piece retainer having a hooked portion adapted to extend around one of the flanges of said frame members and having a hook end adapted to coöperate with an inner side of said frame member considerably away from the flange edge and securing means engaging said retainer and adapted to clamp said retainer in substantially rigid supporting position with respect to the coöperating frame member.

GEORGE ALBERT LYON.

Witnesses:
HARRY L. DUNCAN,
JESSIE B. KAY.